Oct. 16, 1945.   R. B. KINGMAN   2,386,900
SCOURER FOR KITCHEN UTENSILS
Filed Oct. 4, 1944

INVENTOR.
Russell B. Kingman,
BY
George D. Richards,
Attorney

Patented Oct. 16, 1945

2,386,900

UNITED STATES PATENT OFFICE 2,386,900

SCOURER FOR KITCHEN UTENSILS

Russell B. Kingman, Orange, N. J.

Application October 4, 1944, Serial No. 557,118

6 Claims. (Cl. 51—185)

This invention relates, generally, to improvements in scoring devices; and the invention has reference, more particularly, to a novel hand implement for scouring pots, pans and other kitchen utensils and other articles or other surfaces which require the application of abrasive action to obtain desired cleaning effects.

The invention has for an object to provide a scouring device of novel construction and functional shape, comprising a substantially rigid body or core having a plurality of peripheral surfaces disposed in various angular relations and including connecting curved surfaces of different radii, whereby such surfaces may be selectively employed in application to generally correspondingly shaped surfaces of utensils or other articles or surfaces to be treated, so as to fittingly contact and scour the same, at least said peripheral surfaces of the body or core being covered with a somewhat resilient coating material of substantial thickness, with at least the external face portions of which abrasive grain material or grit is incorporated in bonded relation thereto.

Other objects of this invention, not at this time more particularly enumerated, will be understood from the following detailed description of the same.

Illustrative embodiments of this invention are shown in the accompanying drawing, in which.

Similar characters of reference are employed in all of the above described views, to indicate corresponding parts.

Figure 1:
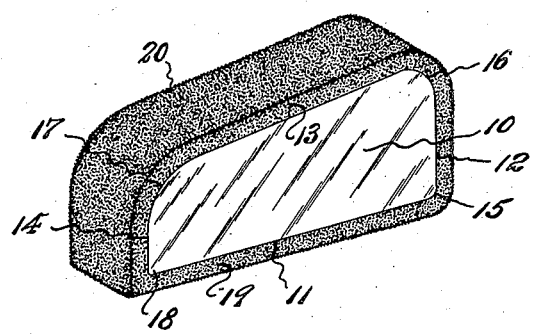
Fig. 1 is a perspective view of one form of scouring device according to this invention.
Figure 2:
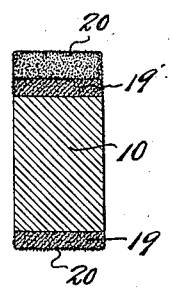
Fig. 2 is a transverse sectional view thereof.

The novel scouring device of this invention comprises a substantially rigid body or block 10 of suitable transverse thickness. Said body or block 10 may be made of any suitable material, such e. g. as wood, plastic material, vulcanized fiber or the like. Said body or block is of irregular peripheral shape to provide a flat bottom surface 11, an inclined top surface 12 angular in plane to the plane of said bottom surface 11, an end surface 13 substantially right angular to said bottom surface 11, and an opposite end surface 14 also substantially right angular to said bottom surface 11. Extending between and connecting said bottom surface 11 and end surface 13 is a curved surface 15 of comparatively small radius. Extending between said end surface 13 and said top surface 12 is a curved surface 16 of relatively larger radius, and extending between said top surface 12 and the opposite end surface 14 is another curved surface 17 of relatively still greater radius. Said respective curved surfaces 15, 16 and 17 will be hereinafter referred to as the minimum surface, the intermediate curved surface and the maximum curved surface. The end surface 14 and bottom surface 11 substantially intersect in angularly related planes to provide a comparatively sharp edged corner section 18.

The periphery of the body or block 10 constituted by the described bottom, top, end and interconnecting curved surfaces, are covered by a coating 19 of substantial thickness made of an adherent plastic material of such nature as to be characterized by the qualities of toughness and elastic resiliency. The plastic material also provides a matrix for strongly gripping and holding, especially at the external surfaces thereof, pulverized abrasive material or grit 20 desired to be incorporated therewith.

I have found a satisfactory plastic material, having the specified characteristics, from which the coating 19 may be formed is afforded by a composition comprising a mixture of co-polymers of both vinyl chloride and vinyl acetate, wherein the former preferably constitutes from 75 to 85 per cent, more or less, of the total mixture. This composition may be initially conditioned by a suitable solvent so as to provide a substantially liquid mass of somewhat viscous consistency, which when dried, so as to be substantially freed of the solvent by evaporation thereof, preferably in the open air, becomes cured to a tough yet resilient homogeneous body texture, while at the same time being adapted to firmly adhere to the surfaces of the body or block 10 to which it is applied, and also being further adapted to form a strong holding matrix for binding to itself, particularly to external surfaces thereof, the pulverized abrasive or grit particles 20 with which it is charged for the purposes of this invention. After the composition is applied to the periphery of the body or block 10 to form the coating 19 thereof, and before the composition sets to final dry condition, i. e. before its external surface solidifies, said external surface portions are dipped in the pulverized abrasive material or grit, or the latter is otherwise applied thereto; whereby to imbed abrasive or grit particles in the external surface portions of the coating 19, so that upon final drying of the composition said particles will be firmly gripped and held by the latter. Alternatively, the abrasive material or grit 20 may be mixed with the viscous composition for dispersion therethrough and for incorporation with its external surface portions, before the composition is applied to the body or block as the peripheral coating 19 thereof.

In the use of the device it will be obvious that by reason of the varied conformation of its operative periphery, as made up of straight and variously sized curved portions, the device may, by applying selected peripheral portions thereof best adapted to conform to or fit the angle or curved portions of utensil or other surfaces desired to be scoured thereby, be caused to easily and effectively reach to and, on movement thereover, scrape and scour said surfaces. For example, in operating upon a pie-plate having its bottom and side walls joined by a concavely curved surface of relatively small radius, such curved surface may be effectively reached and scoured by applying thereto the peripheral surface of the device which is defined by the minimum curved surface 15. On the other hand, in operating upon a sauce-pan e. g. having its bottom and side walls joined by a concavely curved surface of larger radius, such surface may be effectively reached and scoured by applying thereto the peripheral surface of the device which is defined by the intermediate curved surface 16. Again, in operating upon a kettle e. g. having its bottom and side walls joined by a concavely curved surface of considerable radius, such surface may be effectively reached and scoured by applying thereto the peripheral surface of the device defined by the maximum curved surface 17. In operating, however, upon a bake-pan or like utensil the bottom and side walls of which intersect substantially at a sharp angle, the interior portions of such angularly related surfaces may best be effectively reached and scoured by applying thereto the sharp edged corner section 18 of the device.

Since the coating 19 of the device is, per se, of resilient character, the same will sufficiently yield under pressure toward the surface undergoing treatment as to assure intimate conforming contact therewith, and so as to further assure that the abrasive material or grit 20 carried thereby will be brought into intimate and firm scraping and scouring engagement with said surface, when the device is rubbed back and forth over the latter. As a consequence of this, an efficient scraping and scouring action is obtained which will quickly loosen and scrape away encrusted and caked dirt, grease and soil, and thereafter efficiently polish the cleansed surface. In such operation, soap and water or other desired cleaning fluid may be used in assistance thereof.

Figure 3:
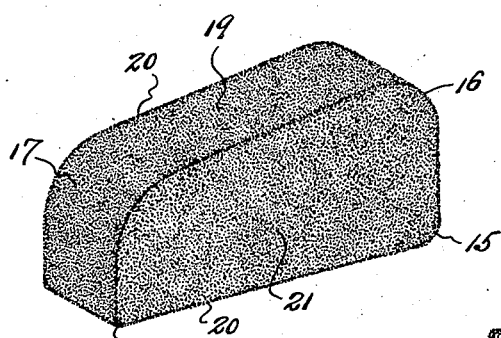
Fig. 3 is a perspective view of another form of scouring device according to this invention.
Figure 4:
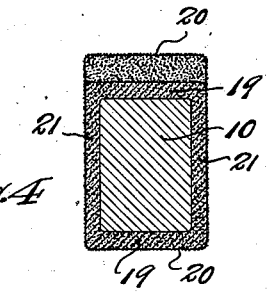
Fig. 4 is a transverse sectional view of the same.

In Figs. 3 and 4 is shown a somewhat modified form of the scouring device characterized as above described, the modification consisting in abrasive charged coating over the side faces of the body or block 10 as well as over the periphery thereof, whereby the periphery will bear the coating 19 as previously described, and the sides of the body or block 10 will bear coating portions 21 extending from and unitary with said peripheral coating 19.

I am aware that some changes of structure and form could be made with respect to the scouring device of this invention without departing from the scope thereof as defined by the following claims. It is therefore intended that the matter described in the foregoing specification and shown in the accompanying drawing shall be considered as illustrative and not in a limiting sense.

I claim:

1. A scouring device comprising a rigid block of substantial transverse thickness having a plurality of substantially flat peripheral surfaces disposed in various angular relations and including, at least between certain thereof, connecting curved surfaces of respectively different radii, a coating of resilient material of substantial thickness adherently covering said peripheral surfaces, and at least external surface portions of said coating having abrasive grit bound thereto.

2. A scouring device comprising a rigid block of substantial transverse thickness and of irregular peripheral shape to provide a bottom surface, a top surface and opposite end surfaces including between certain thereof curved connecting surfaces of respectively different radii, a coating of resilient material of substantial thickness adherently covering at least said peripheral surfaces of the block, and at least external surface portions of said coating having abrasive grain bound therein and thereto by the material of said coating.

3. A scouring device comprising a rigid block of substantial transverse thickness and of irregular peripheral shape to provide a bottom surface, a top surface and end surfaces, said bottom surface and one end surface being connected by a curved surface of small radius, the top surface and said end surface being connected by a curved surface of relatively greater radius, and said top surface and the other end surface being connected by a curved surface of still greater radius, a coating of resilient material of substantial thickness adherently covering at least said peripheral surfaces of the block, and at least external surface portions of said coating having abrasive grit bound thereto.

4. A scouring device comprising a rigid block of substantial transverse thickness and of irregular peripheral shape to provide a bottom surface, a top surface and end surfaces, said bottom surface and one end surface being connected by a curved surface of small radius, the top surface and said end surface being connected by a curved surface of relatively greater radius, said top surface and the other end surface being connected by a curved surface of still greater radius, and said bottom surface and said last mentioned end surface intersecting in angularly related planes to provide a comparatively sharp edged corner section, a coating of resilient material of substantial thickness adherently covering at least said peripheral surfaces of the block, and at least external surface portions of said coating having abrasive grit bound therein and thereto.

5. A scouring device comprising a rigid block of substantial transverse thickness and of irregular peripheral shape to provide a bottom surface, a top surface and end surfaces, said bottom surface and one end surface being connected by a curved surface of small radius, the top surface and said end surface being connected by a curved surface of relatively greater radius, said top surface and the other end surface being connected by a curved surface of still greater radius, and said bottom surface and said last mentioned end surface intersecting in angularly related planes to provide a comparatively sharp edged corner section, a coating of resilient material of substantial thickness adherently covering at least said peripheral surfaces of the block, and at least external surface portions of said coating having abrasive grit bound therein and thereto by the material of said coating, said coating material comprising a curved composition of the co-polymers of vinyl chloride and vinyl acetate in which the former predominates.

6. A scouring device as defined in claim 2 wherein the coating material comprises a cured composition of the co-polymers of vinyl chloride and vinyl acetate in which the former predominates.

RUSSELL B. KINGMAN.